United States Patent [19]
Li et al.

[11] Patent Number: 5,720,004
[45] Date of Patent: Feb. 17, 1998

[54] CURRENT-MODE HAMMING NEURAL NETWORK

[75] Inventors: Zhijian Li; Bingxue Shi; Wei Lu, all of Beijing, China

[73] Assignee: United Microelectronics Corporation, Hsinchu, Taiwan

[21] Appl. No.: 537,320

[22] Filed: Sep. 29, 1995

[51] Int. Cl.$^6$ ..................................................... G06F 15/18
[52] U.S. Cl. .............................................. 395/24; 395/27
[58] Field of Search ......................................... 395/27, 24

[56] References Cited

U.S. PATENT DOCUMENTS

| | | | |
|---|---|---|---|
| 4,999,525 | 3/1991 | Park et al. | 395/24 |
| 5,034,918 | 7/1991 | Jeong | 395/24 |
| 5,040,134 | 8/1991 | Park | 395/24 |
| 5,059,920 | 10/1991 | Anderson et al. | 395/24 |
| 5,122,983 | 6/1992 | Massengill | 395/24 |
| 5,148,514 | 9/1992 | Arima et al. | 395/24 |
| 5,155,377 | 10/1992 | Castro | 395/24 |
| 5,237,289 | 8/1993 | Han | 395/24 |
| 5,381,515 | 1/1995 | Platt et al. | 395/24 |
| 5,519,811 | 5/1996 | Yoneda et al. | 395/24 |
| 5,537,512 | 7/1996 | Hsia et al. | 395/24 |

OTHER PUBLICATIONS

Johnson et al. "Parameter Variations MOS CAM with a Mutual Inhibition Network", IEEE Trans. on Circuits and Systems, vol. 38, No. 9, Sep. 1991.

*Primary Examiner*—George B. Davis
*Attorney, Agent, or Firm*—Curtis, Morris & Safford, P.C.

[57] ABSTRACT

A current-mode Hamming neural network is provided with N binary inputs, and has a template matching calculation subnet and a winner-take-all subnet. The template matching calculation subnet includes M first neurons in which M exemplar templates are stored respectively. Each first neuron is consisted of current mirrors connected to and controlled by the N binary inputs respectively, to generate a template matching current signal which is substantially proportional to the number of matched bits between the N binary inputs and the corresponding stored exemplar template. The winner-take-all subnet includes M second neurons, each including M transistors with their gate electrodes connected together to form a template competition node, their source electrodes connected to ground, and their drain electrodes connected to the template competition nodes respectively. The template competition nodes are coupled to and receive the template matching current signals respectively, so that the template competition node connecting with the largest template matching current signal is eventually at a relatively high voltage level, and the other template competition nodes are at a relatively low voltage level, after competition.

3 Claims, 2 Drawing Sheets

CURRENT-MODE HAMMING NEURAL NETWORK

BACKGROUND OF THE INVENTION

The present invention relates to a current-mode Hamming neural network, and more particularly to a current-mode analog integrated circuit of Hamming neural network which can be fabricated in CMOS (Complementary-Metal-Oxide-Semiconductor) technology. The Hamming neural network has no clock and achieves high speed.

Artificial neural network models have been studied for many years in the hope of achieving human-like performance in the fields of speech and image recognition. Now the main research method in this field is still using software to simulate some models or realize some algorithms. Although this research method can solve many problems, it is not suitable for some applications requiring real-time processing such as some image and speech recognition applications. The modern VLSI (Very-Large-Scale-Integration) technology has made it possible to fabricate more practicable artificial neural network chip. Using digital logic circuit can not realize really full parallel processing. The artificial neural network realized by analog integrated circuit have full parallel processing capability and other inherent advantages of biological neural networks.

The literature "An Introduction to Computing with Neural Nets", Richard P. Lippmann, *IEEE ASSP Magazine*, pp. 4–22, April 1987, provides an introduction to the field of artificial neural networks by reviewing six important neural network models that can be used for pattern classification. As described in Lippmann's literature, these networks are highly parallel building blocks that illustrate neural-network components and design principles and can be used to construct more complex systems. One of the six neural network models is the Hamming network which is a neural network implementation of the optimum classifier for binary patterns corrupted by random noise. The structural model of a feed-forward Hamming network maximum likelihood classifier for binary inputs corrupted by network is described in FIG. 6 of Lippmann's literature. The Hamming network is a two-layer network, and implements the optimum minimum error classifier when bit errors are random and independent. The lower subnet shown in Lippmann's FIG. 6 calculates N minus the Hamming distance to M exemplar patterns. The upper MAXNET subnet selects that node with the maximum output. All nodes use threshold-logic nonlinearities where it is assumed that the outputs of these nonlinearities never saturate.

The operation of the Hamming network is described in Box 2 of Lippmann's literature. Weights and thresholds are first set in the lower subnet such that the matching scores generated by the outputs of the middle nodes of FIG. 6 are equal to N minus the Hamming distance to the exemplar patterns. These matching scores will range from 0 to the number of elements in the input (N) and are highest for those nodes corresponding to classes with exemplars that best match the input. Thresholds and weights in the MAXNET subnet are fixed. All thresholds are set to zero and weights from each node to itself are 1. Weights between nodes are inhibitory with a value of $-\epsilon$ where $\epsilon<1/M$.

After weights and thresholds have been set, a binary pattern with N elements is presented at the bottom of the Hamming network. It must be presented long enough to allow the matching score outputs of the lower subnet to settle and initialize the output values of the MAXNET. The input is then removed and the MAXNET iterates until the output of only one node is positive. Classification is then complete and the selected class is that corresponding to the node with a positive output.

The copending patent application entitled "Hamming Neural Network Circuit", filed by the applicants on Sep. 30, 1994, Ser. No. 08/316,135, discloses a circuit which can realize the Hamming network model, and is very suitable for being fabricated in CMOS technology. The hardware implementation of artificial neural network is very difficult. The most favorable method is based on the current-mode. The "Hamming Neural Network Circuit", however, is not a current-mode neural network.

SUMMARY OF THE INVENTION

Thus, the primary object of the present invention is to provide a current-mode Hamming neural network which can also realize the Hamming network model, and is very suitable for being fabricated in CMOS technology.

In accordance with the present invention, a current-mode Hamming neural network having N binary inputs, comprises a template matching calculation subnet including M first neurons in which M exemplar templates are stored respectively, each first neuron being consisted of current mirrors which are connected to and controlled by the N binary inputs respectively, to generate a template matching current signal, the template matching current signal being substantially proportional to the number of matched bits between the N binary inputs and the corresponding exemplar template stored in the M first neurons; and a winner-take-all subnet including M second neurons, each including M transistors with their gate electrodes connected together to form a template competition node, their source electrodes connected to ground, and their drain electrodes connected to the template competition nodes respectively, the template competition nodes being coupled to and receiving the template matching current signals respectively, so that the template competition node connecting with the largest template matching current signal is eventually at a relatively high voltage level, and the other template competition nodes connecting with the other template matching current signals are at a relatively low voltage level, after competition.

According to one feature of the present invention, in each first neuron parts of the binary inputs are selectively inverted, depending upon the corresponding exemplar template to be stored in the first neuron.

According to another feature of the present invention, the template matching current signals $$I_m = I_s \times N_m$$

wherein $N_m$, is the number of matched bits, and $I_s$ is the current of current mirrors.

BRIEF DESCRIPTION OF THE DRAWINGS

The present invention can be more fully understood by reference to the following description and accompanying drawings, which form an integral part of this application.

DETAILED DESCRIPTION OF THE PREFERRED EMBODIMENTS

Figure 1:
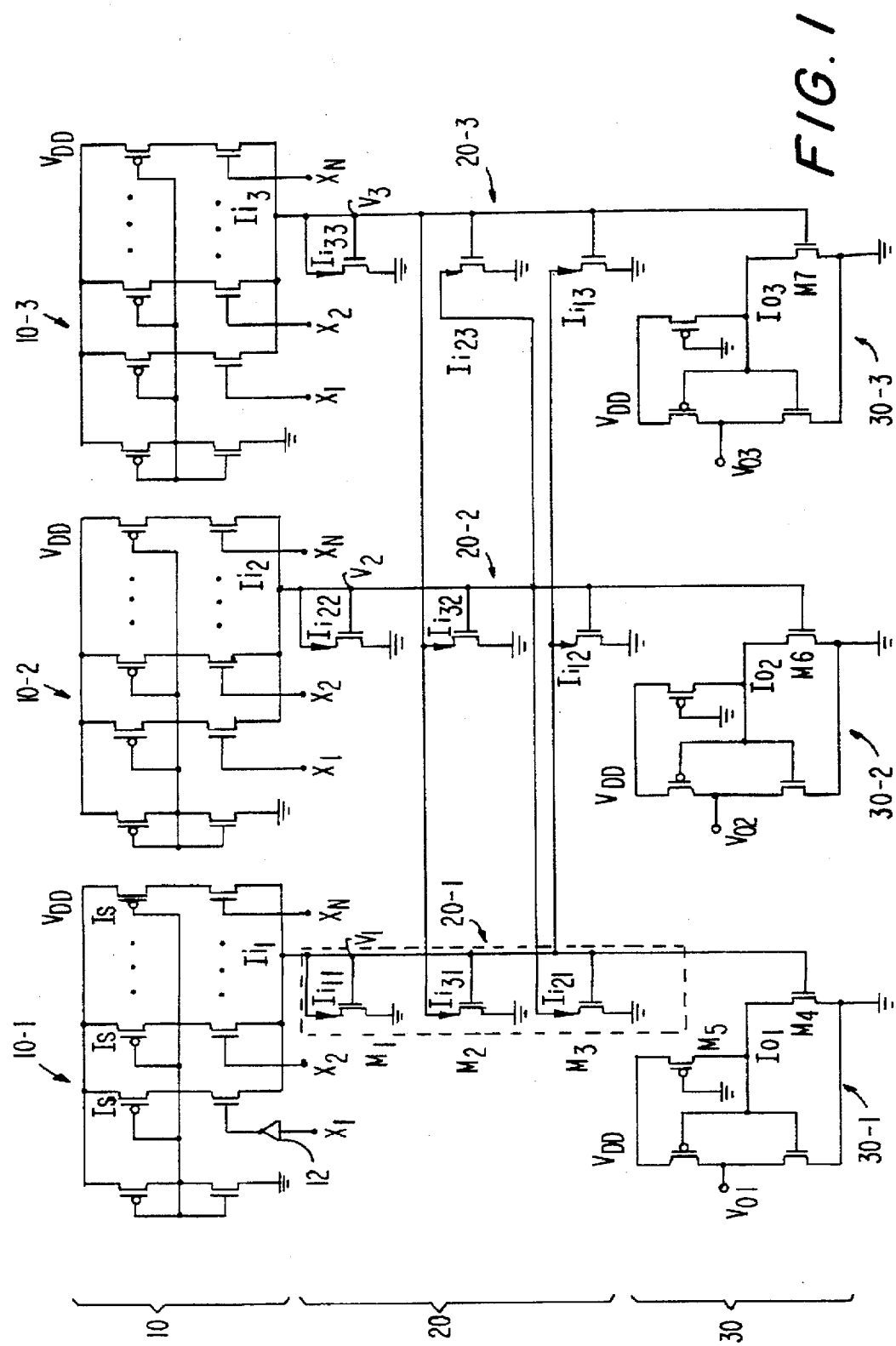
FIG. 1 is a schematically electrical circuit diagram of a current-mode Hamming neural network according to one preferred embodiment of the present invention.

Referring now to FIG. 1, there is shown a current-mode Hamming neural network suitable to be fabricated in CMOS technology, according to one preferred embodiment of the present invention. The current-mode Hamming neural network of the present invention includes a template matching (or Hamming distance) calculation subnet 10 consisted of three first neurons 10-1 through 10-3; a winner-take-all subnet 20 consisted of three second neurons 20-1 through 20-3; and a converter subnet 30 consisted of three converters 30-1 through 30-3. It should be understood by those skilled in the art that the numbers of the first and second neurons, and the converters are consistent, and depend on the number of the templates to be stored in the Hamming neural network for recognition.

Figure 2A:
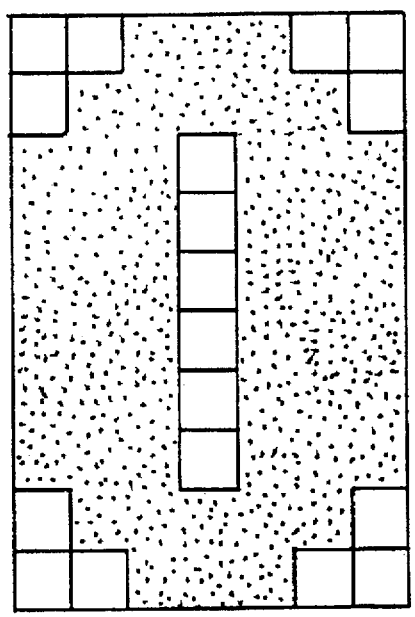
FIGS. 2a, 2b and 2c illustrate three exemplar patterns or templates of Arabic numerals "0" to "2", constructed by 70 (7×10 array) binary pixels.
Figure 2B:
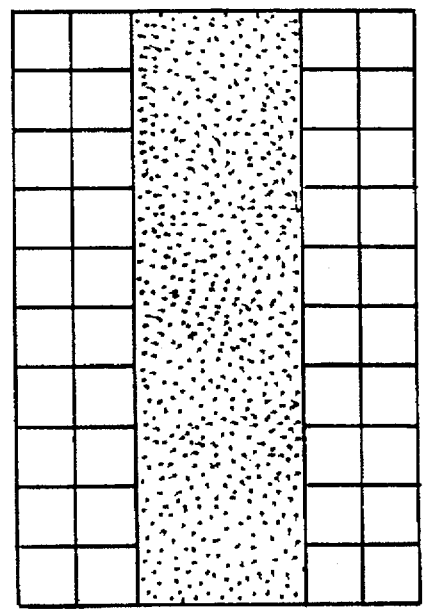
Figure 2C:
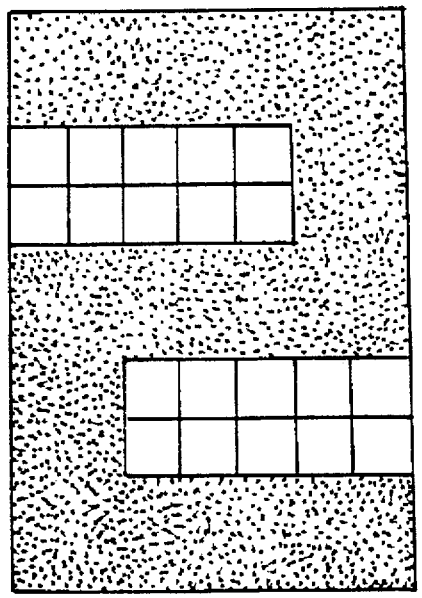

As known, the Hamming neural network can be used for speech and image recognitions, and its inputs are binary signals. As shown in FIG. 1, the current-mode Hamming neural network has N binary inputs $X_1$ through $X_N$, and three exemplar template outputs $V_{O1}$ through $V_{O3}$. The three exemplar templates or patterns to be stored in the network can be determined and designed by statistics and analysis. Referring to FIG. 2, there is shown three exemplar templates or patterns of Arabic numerals "0" to "2" consisted of 7×10 array of binary pixels, i.e. white and black pixels, just for easy understanding of the present invention. In this case, the number N is 70, and the number of templates is 3. The white pixel may be represented by a logic "0" signal while the black pixel may be represented by a logic "1" signal. The unknown pattern containing 70 binary pixels is inputted into the Hamming neural network circuit via the binary inputs $X_1$ through $X_N$, and the Hamming neural network determines which one of the three exemplar templates is most representative of the unknown pattern by generating a logic "1" signal at the corresponding exemplar template output and a logic "0" signal at the other exemplar template outputs.

All first neurons 10-1–10-3 have the same circuit structure except the input connections to the binary inputs $X_1$ through $X_N$. Every first neuron and its connections in the template matching calculation subnet 10 are composed of current mirrors which are "ON" or "OFF" states dependent on the input pattern and the stored exemplar template. The exemplar templates stored in the first neurons 10-1–10-3 are reflected in the input connections of each neuron. More specifically, since the exemplar templates all contain white (e.g. represented by logic "0") and black (e.g. represented by logic "1") pixels, the expected logic "0" inputs in respective first neurons 10-1~10-3 are connected to the current mirrors via inverters 12, and the expected logic "1" in respective first neurons 10-1~10-3 are connected to the current mirrors directly. For example, the first binary input $X_1$ of the first neuron 10-1 is connected to the current mirror via the inverter 12, and the second binary input $X_2$ of the first neuron 10-1 is connected to the current mirror directly, as shown in FIG. 1. If the bit $X_1$ of the unknown binary pattern is logic "0", the current mirror is turned on to contribute a current $I_s$ of the current mirror at a template matching current output $I_n$ of the first neuron 10-1. If the bit $X_1$ of the unknown binary pattern is logic "1", the current mirror is turned off not to contribute a current $I_s$ at the template matching current output $I_n$. The total current values of the template matching current outputs $I_n$, $I_{12}$ and $I_{13}$ respectively stand for the matching degrees between the unknown binary pattern and the stored exemplar templates, for example the Arabic numerals "0", "1" and "2". If the unknown binary pattern with N elements matches perfectly with a stored template, maximum current output can be achieved. The template matching current output $I_{im}$ ($I_n$, $I_{12}$ or $I_{13}$) is proportional to the number of matched bits or points. That is $$I_{im}=I_s \times N_m$$

wherein $N_m$ is the number of matched bits, and $I_s$ is the current of current mirrors.

The template matching current outputs $I_n$, $I_{12}$ and $I_{13}$ of the template matching calculation subnet 10 are connected to the template competition nodes $V_1$~$V_3$ of the winner-take-all subnet 20 respectively, as shown in FIG. 1. The second neurons 20-1 through 20-3 of the winner-take-all subnet 20 have the same circuit structure, and are all a distributed neuron structure. All the second neurons 20-1 through 20-3 with inhibitory connections each other form a Hopfield network. More specifically, each second neuron includes three NMOS transistors with their gate electrodes connected together to form the template competition node $V_1$~$V_3$, their source electrodes connected to ground, and their drain electrodes connected to the template competition nodes $V_1$~$V_3$ respectively. For example, the second neuron 20-1 includes three NMOS transistors $M_1$, $M_2$ and $M_3$. The gate electrodes of the transistors $M_1$, $M_2$ and $M_3$ are connected together to form the template competition node $V_1$ which is in turn connected to the template matching current output $I_n$ of the first neuron 10-1. The source electrodes of the transistors $M_1$, $M_2$ and $M_3$ are connected to ground, and the drain electrodes are connected to the template competition nodes $V_1$, $V_3$, and $V_2$ respectively During competition, the largest template matching current among the input currents of the winner-take-all subnet 20 will cause increase of the voltage of the template competition node which receives the largest current, and decrease of the voltages of other template competition nodes. Suppose the template matching current output $I_n$ is the largest one among the input currents, the voltage of the template competition node $V_1$ increases, and the voltages of other template competition nodes $V_2$ and $V_3$ decrease. Take the 3-input 3-output winner-take-all network 20 shown in FIG. 1 as an example. The mechanism of the winner-take-all subnet 20 is as follows:

At first, assuming that $V_1=V_2=V_3$, we get the following equations:

$$I_n=I_{12}=I_{13}$$

$$I_n=I_{n1}+I_{n2}+I_{n3}$$

$$I_{l2}=I_{l21}+I_{l22}+I_{l23}$$

$$I_{l3}=I_{l31}+I_{l32}+I_{l33}$$

If $I_n$ increases, then we get:

$$I_{n1} \geq I_{l21}, I_{n2} \geq I_{l22}, \text{ and } I_{n3} \geq I_{l23}$$

Therefore, the voltage of the template competition node $V_1$ increases. The increase of $V_1$ brings about the decrease of the voltages of the template competition nodes $V_2$ and $V_3$. Finally, the feedback system teaches a steady status: the transistor $M_1$ is in saturation region, the transistors $M_2$ and $M_3$ are in linear region, and other NMOS transistors of the winner-take-all subnet 20 are cutoff.

The converters 30-1 through 30-3 in the subnet 30 are controlled by the template competition nodes $V_1$ through $V_3$ respectively. The above-described voltage changes of the template competition nodes $V_1$ through $V_3$ cause that the NMOS transistor $M_4$ of the converter 30-1 is turned on. This in turn causes the output current $I_{o1}$ of the converter 30-1 to be an invariant current which is determined by the saturated PMOS transistor $M_5$. The NMOS transistors $M_6$ and $M_7$ of the converters 30-2 and 30-3 are turned off, causing the output currents $I_{o2}$ and $I_{o3}$ of the converters 30-2 and 30-3 to be zero. The converters 30-1 through 30-3 includes CMOS inverters which are used to convert the current signals $I_{o1}$, $I_{o2}$ and $I_{o3}$ into the voltage signals $V_{o1}$, $V_{o2}$ and $V_{o3}$. After the CMOS inverters, the exemplar template output $V_{o1}$ is $V_{DD}$, and the exemplar template outputs $V_{o2}$ and $V_{o3}$ are 0 volt. This means that the unknown pattern most matches the exemplar template stored in the first neuron 10-1.

Simulation shows that the current-mode Hamming neural network of the present invention has high precision, high speed and low dissipation. The current-mode Hamming neural network has no clock, and can be easily applied to template matching and K-NN (K-Nearest Neighborhood) method. The applicants have applied it to the handwritten digit recognition and achieved good results.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A current-mode Hamming neural network having N binary inputs, comprising:

a template matching calculation subnet including M first neurons in which M exemplar templates are stored respectively, each first neuron being consisted of current mirrors which are connected to and controlled by said N binary inputs respectively, to generate a template matching current signal, said template matching current signal being substantially proportional to the number of matched bits between said N binary inputs and a corresponding exemplar template stored in said M first neurons; and a winner-take-all subnet including M second neurons, each including M transistors with their gate electrodes connected together to form a template competition node, their source electrodes connected to ground, and their drain electrodes connected to a respective template competition node, each said template competition node being coupled to and receiving a respective one of said template matching current signals, so that the template competition node connecting with the largest template matching current signal is eventually at a relatively high voltage level, and the other template competition nodes connecting with the other template matching current signals are at a relatively low voltage level, after competition in said second neurons.

2. The current-mode Hamming neural network as claimed in claim 1, wherein in each first neuron, parts of said binary inputs are selectively inverted, depending upon the corresponding exemplar template to be stored in said first neuron.

3. The current-mode Hamming neural network as claimed in claim 2, wherein said template marching current signals $$I_{tm} = I_s \times N_m$$

wherein $N_m$ is the number of matched bits, and $I_s$ is the current of current mirrors.

* * * * *